(12) United States Patent
Hallikainen

(10) Patent No.: US 11,881,778 B2
(45) Date of Patent: Jan. 23, 2024

(54) DCDC CONVERTERS

(71) Applicant: Nordic Semiconductor ASA, Trondheim (NO)

(72) Inventor: Samuli Hallikainen, Oulu (FI)

(73) Assignee: Nordic Semiconductor ASA, Trondheim (NO)

( * ) Notice: Subject to any disclaimer, the term of this patent is extended or adjusted under 35 U.S.C. 154(b) by 95 days.

(21) Appl. No.: 17/500,633

(22) Filed: Oct. 13, 2021

(65) Prior Publication Data

US 2022/0115951 A1 Apr. 14, 2022

(30) Foreign Application Priority Data

Oct. 14, 2020 (GB) .................................. 2016268

(51) Int. Cl.
*H02M 3/158* (2006.01)
*H02M 1/00* (2006.01)

(52) U.S. Cl.
CPC ............ *H02M 3/158* (2013.01); *H02M 1/009* (2021.05); *H02M 1/0045* (2021.05)

(58) Field of Classification Search
CPC .......................................... H02M 3/155–1588
See application file for complete search history.

(56) References Cited

U.S. PATENT DOCUMENTS

| | | | |
|---|---|---|---|
| 2006/0221649 A1 | 10/2006 | Yamanaka et al. | |
| 2012/0080945 A1 | 4/2012 | Vasadi et al. | |
| 2012/0286576 A1 | 11/2012 | Jing et al. | |
| 2013/0082673 A1 | 4/2013 | Sako | |
| 2015/0062108 A1* | 3/2015 | Archibald | G06F 1/26 345/212 |
| 2016/0379581 A1* | 12/2016 | Takenaka | H02M 3/156 345/212 |
| 2017/0093278 A1 | 3/2017 | Unno et al. | |
| 2017/0373597 A1 | 12/2017 | Kato et al. | |

FOREIGN PATENT DOCUMENTS

| | | |
|---|---|---|
| EP | 2 622 723 B1 | 1/2019 |
| EP | 3432454 A1 | 1/2019 |
| JP | 2018074850 | 5/2018 |

OTHER PUBLICATIONS

Martinez et al., "Single-Input Dual-Output (SIDO) Linear-Assisted DC/DC Converter," XVI Annual Seminar on Automation, Industrial Electronics and Instrumentation, 2008, 6 pages.
Search Report under Section 17(5) for GB2016268.1, issued by the IPO dated Mar. 25, 2021, 3 pages.
Search Report under Section 17(5) for GB2016283.0, issued by the IPO dated Mar. 25, 2021, 3 pages.
Search Report under Section 17(5) for GB2016292.1, issued by the IPO dated Mar. 25, 2021, 3 pages.

\* cited by examiner

*Primary Examiner* — Peter M Novak
(74) *Attorney, Agent, or Firm* — Klarquist Sparkman, LLP

(57) ABSTRACT

A circuit portion comprises a DCDC converter that is configured to charge and discharge an inductor according to a duty cycle to provide current to an output load. A duty module is configured to determine the duty cycle such that the DCDC converter will output a target current. A duty limiter module is configured to cause the inductor to discharge early if the determined duty cycle exceeds a threshold.

15 Claims, 2 Drawing Sheets

DCDC CONVERTERS

CROSS-REFERENCE TO RELATED APPLICATION

This application claims priority to United Kingdom Patent Application No. 2016268.1, filed Oct. 14, 2020, which application is incorporated herein by reference in its entirety.

BACKGROUND OF THE INVENTION

The present invention relates to a single-input multiple-output (SIMO) step-down DCDC "Buck" converter.

Modern portable electronic devices are typically provided with a power source such as a battery that acts as a direct current (DC) power supply for the various electronic components within the device. However, typically these components will have different voltage requirements and so it is conventional for such devices to employ one or more DC-DC converters that step a nominal voltage associated with the power supply down to a voltage appropriate for the different electronic components. While this could be achieved by using a potential divider network (e.g. a series of resistors) to create a number of "taps" having different voltages, this is highly inefficient as energy is simply wasted as heat dissipated across the resistors.

One alternative arrangement known in the art per se is a buck converter. A buck converter circuit utilises an inductor-capacitor or "LC" circuit which is periodically connected to and disconnected from the power supply (e.g. by intermittently opening and closing a switch, typically implemented as a transistor referred to as the "high-side" (HS) transistor) by a driver in order to step down the voltage. This can be seen as an electrical equivalent to a mechanical flywheel, wherein energy is periodically input to the system to keep it outputting energy at a steady rate. The ratio of the output voltage to the input voltage can be adjusted by altering the duty cycle of a pulse width modulated (PWM) drive signal produced by the driver that is applied to the gate of the high-side transistor in order to open and close it.

A synchronous buck converter circuit replaces what is known as the "freewheeling" or "flyback" diode with a second transistor, often referred to as the "low-side" (LS) transistor. The driver then closes the low-side transistor when opening the high-side transistor and vice versa by applying appropriate PWM drive signals to the high- and low-side transistors to open and close them so as to intermittently couple the LC circuit to the input voltage. This improves the efficiency of the buck converter in exchange for increasing the bill of materials associated with the circuit. The efficiency of the DC-DC converter increases for increased output currents. A buck converter may be implemented in a circuit, e.g. on a system-on-chip (SoC), and arranged to deliver power to multiple loads (i.e. a Single-Input Multiple-Output (SIMO) buck converter). In such systems, the supply of power may be rotated between each load in turn according to a fixed repeated sequence, such that the load is switched in time with a clock signal.

A buck converter may be operated by a PWM module in continuous conduction mode (CCM) or in discontinuous conduction mode (DCM). In DCM, the current in the inductor of the buck converter is zero at the end of each cycle (i.e. one charge event and one discharge event) of the buck converter. That is, the charge-discharge cycle of the buck converter is shorter than the period of the clock signal that causes the load to be switched. In CCM, the current in the inductor is non-zero at the end of each cycle, i.e. the current does not reduce to zero as the charge-discharge cycle of the buck converter is equal to or greater than the clock period.

In applications comprising multiple load channels, it is desirable to avoid operating in CCM. This is because there is a risk of poor cross-regulation between the output channels, owing to residual charge in the inductor when the output channel is rotated from one load to another. However, when the loading of one of the loads is particularly high (i.e. the loads are unbalanced), the PWM module is typically configured to lengthen the charge-discharge cycle of the buck converter in order to increase the average current delivered to the demanding load. It will be appreciated that this has the effect of moving the operation of the buck converter from DCM towards CCM, which can result in poor cross-regulation between output channels with detrimental effects.

The present invention seeks to provide an improved system for controlling a SIMO DCDC converter.

SUMMARY OF THE INVENTION

When viewed from a first aspect, the invention provides a circuit portion for providing a target current to an output load and comprising:
- a DCDC converter comprising an inductor and configured to charge and discharge the inductor according to a duty cycle to provide current to the output load;
- a duty module configured to determine the duty cycle such that the DCDC converter will output the target current; and
- a duty limiter module configured to cause the inductor to discharge early if the determined duty cycle exceeds a threshold.

Thus, it will be appreciated that the present invention provides a circuit that is configured to cause the inductor of a DCDC converter to discharge earlier than would occur according to the duty cycle if it is determined that the duty cycle required in order to deliver a target current to a load is too high. This means the circuit can ensure that the DCDC converter does not begin to operate in CCM. However, it will be appreciated that causing the inductor to discharge early in this way will prevent the DCDC converter from delivering all of the target current to the output load. Thus, the output load may receive a reduced current and reduced voltage when this interruption occurs.

Conventional techniques for increasing the output current include lowering the inductance of the inductor and, where current is supplied to a plurality of output loads in turn, reducing the frequency with which the supply is switched between outputs. However, it will be appreciated that such techniques can reduce the overall efficiency of the system by increasing output voltage ripple and causing high peak currents, and may require the physical components of the circuit to be replaced.

The Applicant has identified a solution in which the full target current can be provided without sacrificing efficiency, whilst maintaining a reasonably high switching frequency that can be optimised to reduce output voltage ripple. Thus, in some embodiments, the circuit further comprises means for supplementing, or a further module arranged to supplement, the current provided by the DCDC converter. The means or further module may comprise a voltage regulator. The voltage regulator may be arranged in parallel with the DCDC converter. In some embodiments, the voltage regulator is configured to provide current to the output load when the determined duty cycle exceeds a threshold. This means that, even when the current provided by the DCDC converter drops as a result of the duty limiter module causing the inductor to discharge early (i.e. before the inductor would have been discharged were it to supply the full demanded load), the full target current may still be provided to the output load, as the remainder can be provided by the voltage regulator.

In some embodiments, the voltage regulator comprises a low-dropout voltage regulator (LDO). The target voltage of the LDO may be set to be lower than a target voltage (e.g. the voltage required to deliver the target current) of the DCDC converter by a predetermined amount. Thus, it will be appreciated that, when the output voltage of the DCDC converter drops by more than the predetermined amount as a result of the reduced current provided by the DCDC converter when the duty limiter module causes the inductor of the DCDC converter to discharge early, the LDO will begin to conduct. The predetermined amount may be set below the target voltage of the DCDC converter such that it is (e.g. just) below the output voltage ripple of the DCDC converter.

Setting the target voltage of the LDO in this way facilitates a seamless transition between the supply of current from the DCDC converter and the supply of current from the LDO. When the duty cycle of the DCDC converter is limited to the CCM boundary by the duty limiter module, the DCDC converter is unable to provide more current to the load. Therefore, the current is automatically provided by the LDO. Thus, no additional circuitry is required in order to effect a logical handover between the DCDC converter and the LDO. This means that the DCDC converter can be kept active together with the LDO. The LDO may draw only a small current when the duty cycle is below the threshold and only be brought into use only when it is needed to supply supplementary current to the output load.

In some embodiments the circuit portion is configured to provide current to a plurality of output loads. In such embodiments, the circuit portion may comprise a dedicated voltage regulator, such as an LDO, for each of the plurality of output loads.

Where the circuit portion is configured to provide current to a plurality of output loads it may comprise channel logic circuitry configured to provide current to each of the plurality of output loads in turn. The channel logic circuitry may provide current to each of the output loads for the duration of one or more discrete time slots. The channel logic circuitry may provide current to each of the output loads according to a cyclical sequence (e.g. the sequence comprising a plurality of time slots).

The target current may be the current required by the output load. In embodiments where the circuit portion is configured to provide current to a plurality of output loads, each output load may require a different target current. In some embodiments, the circuit portion comprises the output load(s).

The duty module may be configured to determine the duty cycle from one or more of: a value of an input voltage, a value of the output voltage required by the output load and a value of the output current. In embodiments where the circuit portion is configured to provide current to a plurality of output loads, the circuit portion may comprise a dedicated duty module for each of the plurality of output loads. In some embodiments, the duty module comprises a pulse width modulation (PWM) module.

The duty module may be configured to output a duty signal at a time (e.g. within each time slot) when, in accordance with the duty cycle, the inductor must begin to discharge in order to provide all of the target current to the output load. It will be appreciated that the greater the target current required by the output load, the later the duty signal will be output (i.e. the later the inductor will be caused to discharge).

The duty limiter module may be configured to compare a length of the duty cycle determined by the duty module with the threshold. The length may be the length of time for which the inductor is to be charged, according to the duty cycle. The threshold may be a predetermined threshold. In some embodiments, the duty limiter module is configured to determine a value of the threshold. The value of the threshold may depend on the operating characteristics (e.g. power consumption) of the (e.g. output load of the) circuit. The duty limiter module may be configured to determine the value of the threshold from a look-up table. In some embodiments, the duty limiter module is configured to calculate the value of the threshold.

The threshold may be a length of time for which the inductor is to be charged. The threshold may be the longest time (e.g. within a time slot) for which the inductor can be charged without forcing the DCDC converter into CCM. The circuit may be configured to compare the duty signal issued by the duty module with the threshold.

In some embodiments, the duty limiter module is configured to calculate the value of the threshold from the maximum voltage value that may be supplied to an output load whilst operating the DCDC converter in DCM, and the input voltage supplied to the DCDC converter. This may correspond to an "ideal" duty cycle, for which one charge event and one discharge event exactly fit into one time slot, for which current is provided to the output load. It will be appreciated that this "ideal" duty cycle provides the latest time that the inductor must begin to discharge in order to fully discharge before the end of the time slot. Thus, this marks the boundary between DCM and CCM operation of the DCDC converter.

In some embodiments, the duty limiter module is configured to output a duty limiter signal at the latest time within a time slot that the inductor must begin to discharge in order for the inductor to fully discharge before the end of the time slot (and, thus, remain in DCM).

In embodiments where the circuit portion is configured to provide current to a plurality of output loads, the circuit portion may comprise a dedicated duty limiter module for each of the plurality of output loads.

In some embodiments, the circuit portion is arranged on an integrated circuit, e.g. a system-on-chip (SoC). The DCDC converter may be a step-down (e.g. "Buck") converter. The DCDC converter may comprise a high side (HS) transistor and a low side (LS) transistor. The DCDC converter may be configured to charge the inductor when the HS transistor is closed (and the LS transistor is open) and to discharge the inductor when the LS transistor is closed (and the HS transistor is open). The circuit portion may provide an input voltage to the DCDC converter.

In some embodiments, the circuit portion comprises duty control logic circuitry, configured to control the LS transistor and the HS transistor of the DCDC converter in accordance with the determined duty cycle (i.e. thereby causing the inductor to charge or to discharge). In some embodiments, the duty control logic circuitry is configured to control the LS transistor and the HS transistor of the DCDC converter in response to the determined duty cycle exceeding the threshold (i.e. to cause the inductor to discharge early). This may be when the duty limiter module outputs a duty limiter signal. In response to the determined duty cycle exceeding the threshold (e.g. the duty limiter module outputting a duty limiter signal), the duty control logic circuitry may be configured to open the HS transistor and to close the LS transistor (thus causing the inductor to discharge). It will be appreciated that this means that, when the determined duty cycle exceeds the threshold, the duty control logic circuitry will cause the inductor to discharge before the inductor would otherwise be caused to discharge (according to the duty cycle determined by the duty module).

The duty control logic circuitry may be configured to monitor the current in the inductor. The duty control logic circuitry may be configured to open the LS transistor when the current in the inductor reduces to zero. The duty control logic circuitry may comprise a zero-cross comparator configured to change output state when the current in the inductor reduces to zero. The duty logic control circuitry may be configured to open the LS transistor when the zero-cross comparator changes output state.

The duty control logic circuitry may be arranged to receive outputs of both the duty module and the duty limiter module. The duty control logic circuitry may be configured to receive at least one of:
- a duty signal output from the duty module, wherein the duty module is configured to output the duty signal at a time when, in accordance with the duty cycle, the inductor must begin to discharge in order to provide all of the target current to the output load; and
- a duty limiter signal output from the duty limiter module.

The duty control logic circuitry may be configured to cause the inductor to discharge in response to receiving either one of the duty signal or the duty limiter signal. In some embodiments, the circuit comprises a logic (e.g. an AND or an OR) gate, through which the outputs of the duty module and the duty limiter module (i.e. the duty signal and the duty limiter signal) are passed. In some embodiments, the duty control logic circuitry is configured to receive the output of the logic gate. The logic gate may be configured to pass whichever of the duty module output and the duty limiter module output arrives at the inputs of the logic gate first. It will be appreciated that, where the duty limiter module is configured to output a duty limiter signal at the latest time that the inductor must begin to discharge in order to for the inductor to fully discharge before the end of the time slot for which current is provided to the output load this duty limiter signal will arrive at the logic gate before the duty signal from the duty module when the duty cycle required to deliver a target current to the output load would cause the DCDC converter to operate in CCM.

The duty limiter signal will then cause the inductor to discharge. Thus, the duty limiter module is configured to issue the duty limiter signal when there will be enough time for the inductor to discharge fully without forcing the DCDC converter into operating in CCM. This means that, no matter the loading of the output, the DCDC converter will be prevented from being forced into operating in CCM. As a result, the adverse effects of CCM, as described above, are avoided.

BRIEF DESCRIPTION OF THE DRAWINGS

An embodiment of the invention will now be described, by way of non-limiting example only, with reference to the accompanying drawings in which.

DETAILED DESCRIPTION

Figure 1:
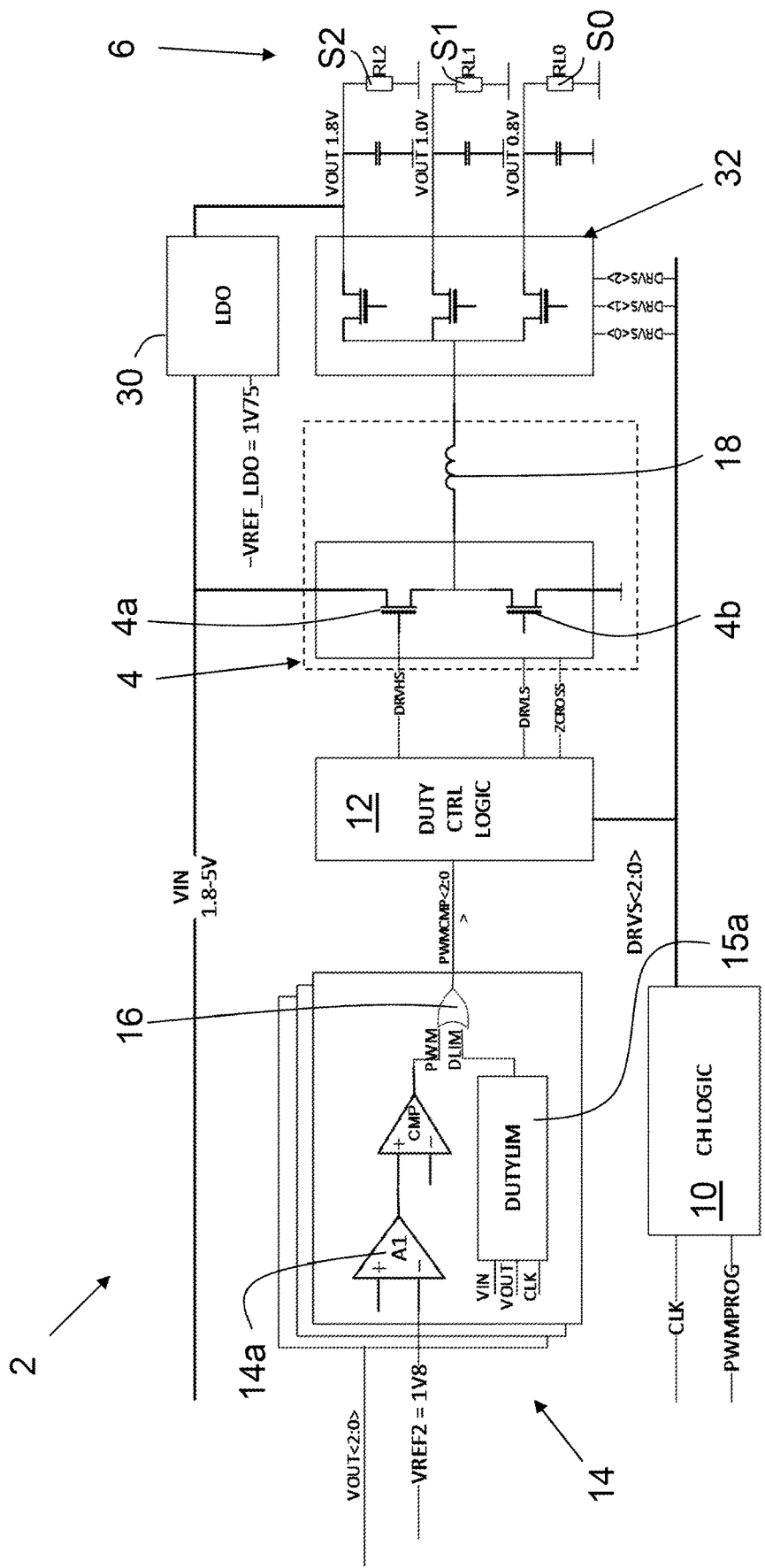
FIG. 1 is a schematic of a circuit portion in accordance with an embodiment of the present invention.

FIG. 1 shows a circuit 2 in accordance with an embodiment of the present invention. The circuit 2 is arranged on a system-on-chip (SoC) and comprises a single-input multiple-output (SIMO) step-down DCDC Buck converter 4 that receives an input voltage $V_{in}$ and provides a load current and load voltage $V_{out}$ to a domain 6. The domain 6 comprises three power channels that are independently electrically connected to the output of the Buck converter 4 to provide power to three loads S2, S1, S0 respectively.

The circuit 2 further comprises channel logic circuitry 10 configured to rotate the supply of power output from the Buck DCDC converter 4 between the three power channels and, thus, between the respective loads S2, S1, S0 according to a repeated channel rotation sequence. The channel logic circuitry 10 receives a clock signal CLK and switches the destination of the output of the Buck converter 4 between the output channels upon the active edge of the clock signal. The channel logic circuitry 10 issues channel selection signals DRVS<2>, DRVS<1>, DRVS<0>, indicating which of the output channels is to receive the output current from the Buck converter 4, according to the channel rotation sequence. Channel selection switches 32 are respectively controlled by the channel selection signals DRVS<2>, DRVS<1>, DRVS<0> and accordingly establish electrical connections between the Buck converter 4 and the loads S2, S1, S0.

The channel logic circuitry 10 receives a sequence control signal that defines the channel rotation sequence, i.e. the order in which current is to be supplied to the loads S0, S1, S2, depending on the loading of the components S2, S1, S0 of the domain 6. The sequence is then repeated in a cyclical fashion, wherein each repetition is a single cycle.

The circuit 2 further comprises duty control logic circuitry 12 that receives the channel selection signals DRVS<2>, DRVS<1>, DRVS<0> from the channel logic circuitry and digital control signals from a controller 14. The controller 14 comprises a PWM duty module 14a, corresponding to the load S2. The controller 14 comprises two further duty modules, corresponding to loads S1 and S0, although, for simplicity, these are not shown in FIG. 1. These further duty modules operate in the same way as the duty module 14a described herein, but each is dedicated to its own load S1, S0.

The PWM duty module 14a is configured to issue a conventional PWM signal PWMCMP2, corresponding to output load S2, to the duty control logic circuitry 12. The conventional PWM signal PWMCMP2 is used to instruct the duty control logic circuitry 12 to activate and deactivate the high side (HS) and low side (LS) switches 4a, 4b of the Buck converter 4 such that the required output current is delivered to the load S2. The time at which this signal PWMCMP2 is sent depends upon the magnitude of the current required by the load S2. The lower the required current, the earlier the PWM signal PWMCMP2 is issued. Conversely, the heavier the loading, the later the PWM signal PWMCMP2 is issued.

The Buck converter 4 also comprises an inductor 18 that can be magnetised (charged) and demagnetised (discharged) depending on the position of the HS and LS switches 4a, 4b. Thus, the PWM signal PWMCMP2 controls when the inductor 18 charges and discharges.

The controller 14 further comprises a duty limiter module 15a corresponding to load S2. The controller 14 comprises two further duty limiter modules, corresponding to loads S1 and S0 respectively, although, for simplicity, these are not shown in FIG. 1. These further duty limiter modules operate in the same way as the duty limiter module 15a described herein, but that each is dedicated to its own load S1, S0.

The duty limiter module 15a is arranged to generate an "ideal" duty cycle $D_{ideal}$ based on the input voltage $V_{in}$ and the maximum output voltage $V_{out}$ that can be provided by the Buck converter 4 within one clock cycle whilst operating in DCM. According to this "ideal" duty cycle, the inductor 18 will be caused to discharge at the point in the clock cycle where the current output from the inductor 18 will return to zero exactly upon, or just before, the next clock pulse. This is at the boundary between DCM and CCM, so the "ideal" duty cycle is essentially equivalent to the duty cycle of the Buck converter 4 when operating in CCM. Therefore, the "ideal" duty cycle is given by:

$$D_{ideal} = \frac{V_{out}}{V_{in}} = \frac{T_{on}}{T_{on} + T_{off}} \quad (1)$$

In equation (1), $T_{on}$ is the time for which the HS switch 4a is closed and the input voltage $V_{in}$ is applied to the inductor 18 of the Buck converter 4 (i.e. the time for which the inductor 18 is charged). $T_{off}$ is the time for which the LS switch 4b is closed and the inductor 18 is discharged. $T_{on}+T_{off}$ is equal to the clock period. The "ideal" duty cycle determined by the duty limiter module 15a is that with which the maximum current may be provided by the Buck converter 4 whilst allowing the current to return to zero before the end of the clock period (i.e. DCM).

The duty limiter module 15a is therefore arranged to issue a signal DUTYLIM2 at the latest point in the clock cycle at which the HS switch 4a may be opened and the LS switch 4b may be closed so that there is enough time for the inductor 18 to discharge fully before the start of the next clock cycle (i.e. to avoid forcing the Buck converter 4 into CCM).

The signal DUTYLIM2 issued by the duty limiter module 15a is gated, by an OR gate 16, with the conventional PWM signal PWMCMP2 such that the signal output from the controller 14 instructing the Buck converter 4 to switch between charging and discharging cycles is issued from the controller 14 to the duty control logic circuitry 12 when the first of either the PWM signal PWMCMP2 or the duty limiter module signal DUTYLIM2 is received. In this way, it can be guaranteed that the Buck converter 4 is switched to discharge before it is forced into CCM.

For low output loading of load S2, the conventional PWM signal PWMCMP2 will be received before the duty limiter signal DUTYLIM2. This means that the Buck converter 4 is able to deliver the required output current whilst remaining in DCM. If, on the other hand, the average current required by the load S2 is sufficiently high, the duty limiter signal DUTYLIM2 is received before the conventional PWM signal PWMCMP2. In this case, the inductor 18 of the Buck converter 4 is caused to discharge early, thus preventing the Buck converter 4 from being forced into operating in CCM. It will be appreciated that this allows the desired state of DCM operation to be maintained, thereby reducing or eliminating the risk of poor cross-regulation as a result of CCM.

When the duty limiter signal DUTYLIM2 causes the Buck converter 4 to discharge early in this way, the total required average current is not delivered to the load S2 by the Buck converter 4.

Therefore, the circuit 2 further comprises a low-dropout regulator (LDO) 30 connected in parallel with the Buck converter 4 between the input voltage source and the load S2. The circuit 2 comprises two further LDOs connected in parallel with the Buck converter 4 between the input voltage source and the loads S1 and S0 respectively. However, these are omitted from FIG. 1 for clarity of illustration.

These further LDOs operate in the same way as the LDO 30 described herein, but each is dedicated to its own load S1, S0.

The target voltage of the LDO 30 is set just below the target voltage for the DCDC converter 4. Thus, should the output voltage of the Buck converter 4 be limited as a result of reduced current being provided by the Buck converter 4 as discussed above, the LDO 30 begins to conduct.

The LDO 30 then provides the remaining required current to the load S2. By setting the dropout voltage $V_{drop}$ in this way, the need for dedicated logic circuitry to facilitate a handover between the Buck converter 4 and the LDO 30 is removed. Operation of the circuit 2 shown in FIG. 1, with a channel rotation sequence of 2-1-0, will now be described. According to this channel rotation sequence, the channel logic circuitry 10 is configured to cycle through each output channel in turn, thereby allocating each output channel the length of a single clock period per sequence during which it is supplied by the output current of the Buck converter 4. Therefore, the current is supplied to the load S2, followed by S1, followed by S0.

Figure 2:
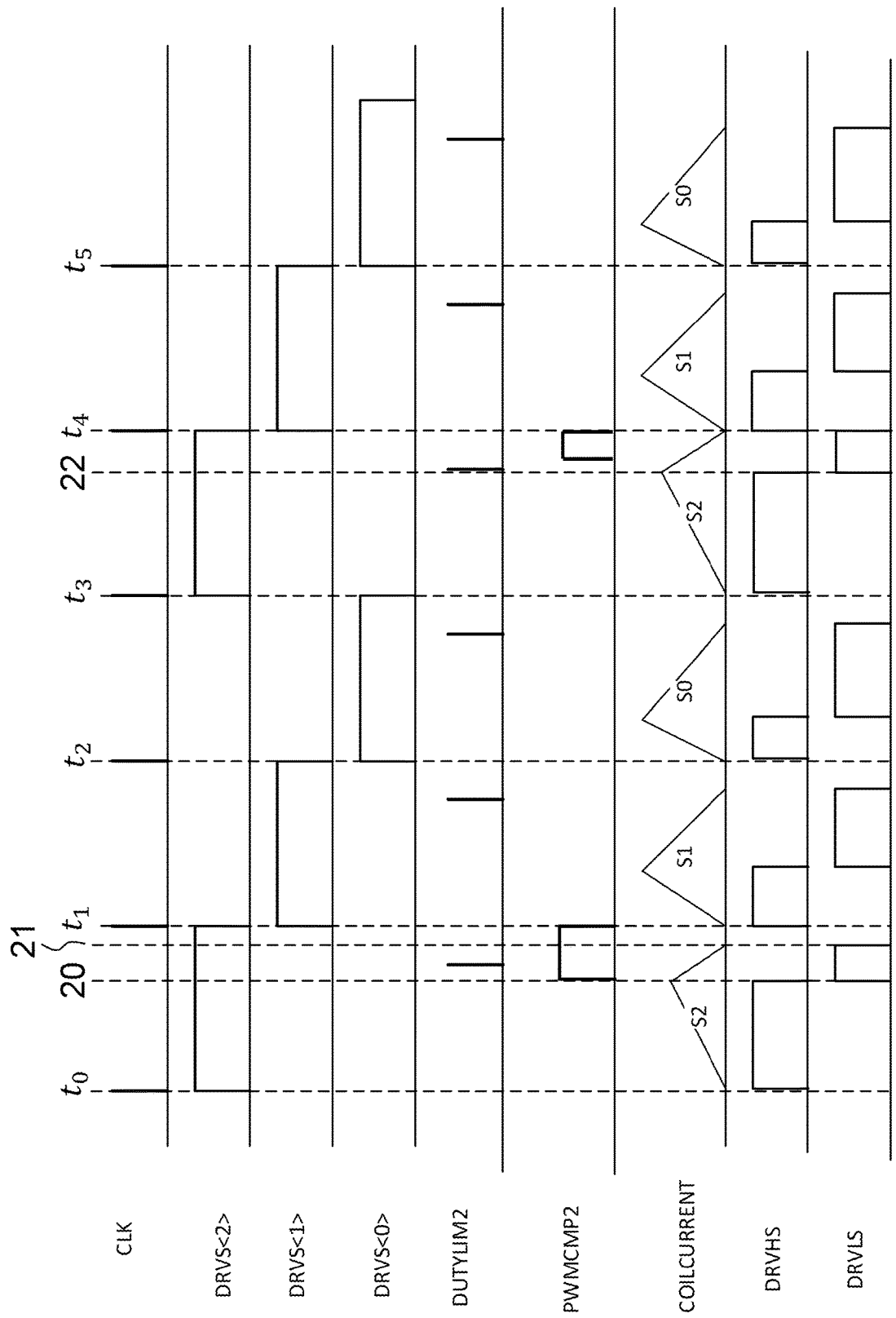
FIG. 2 is a graph of the outputs of the circuit shown in FIG. 1.

The output of the circuit 2 is shown in FIG. 2. FIG. 2 shows traces of the clock signal CLK, the channel selection signals DRVS<2>, DRVS<1>, DRVS<0> that are produced by the channel logic circuitry 10 for each of the three output channels S2, S1, S0 respectively, and the current COILCURRENT that is supplied to the loads S2, S1, S0 by the Buck converter 4. The traces of the signals DRVHS and DRVLS sent by the duty control logic circuitry 12 to the HS and LS switches 4a, 4b of the Buck converter 4 respectively are also shown in FIG. 2.

The clock signal CLK comprises a number of pulses, between which a clock period is defined. A logic high channel selection signal DRVS<2>, DRVS<1>, DRVS<0> indicates that the corresponding load S2, S1, S0 will receive the output current from the Buck converter 4.

The trace of the signal PWMCMP2 issued by the PWM duty module 14a, corresponding to load S2, is also shown in FIG. 2. It will be noted that the signals issued by the PWM duty modules for loads S1, S0 respectively are not shown in this Figure.

During the first stage of the sequence (from $t_0$ to $t_1$), the channel logic circuitry 10 outputs a logic high signal DRVS<2>, in accordance with the channel sequence 2-1-0, thereby indicating that load S2 is to receive the output current COILCURRENT from the Buck converter 4 for the duration of this clock period.

At the start of the clock period (at time $t_0$), a logic high DRVHS signal is output to the HS switch 4a of the Buck converter 4 (and the LS switch 4b is deactivated) to cause the inductor 18 to charge. This causes an increase in the current COILCURRENT in the inductor 18 as shown by the rising slope.

At time 20, the PWM duty module 14a issues a signal PWMCMP2, indicating that the inductor 18 of the Buck converter 4 may begin to discharge so that the full output current that is required by the load S2 during this stage of the sequence (between $t_0$ and $t_1$) may be delivered. This causes the duty control logic circuitry 12 to cease outputting a logic high DRVHS signal and to instead issue a logic high DRVLS signal. Thus, the HS switch 4a of the Buck converter 4 is deactivated and the LS switch 4b is activated. As a result, the current COILCURRENT in the inductor 18 is discharged between time 20 and time $t_1$ as shown by the falling slope. At time 21, the current COILCURRENT in the inductor 18 reaches zero, thus triggering a zero-cross comparator signal that causes the duty control logic circuitry 12 to cease outputting a logic high DRVLS signal, thereby deactivating the LS switch.

A single cycle of the Buck converter 4 thus comprises a coil magnetisation period (HS switch 4a closed, LS switch 4b open) followed by a coil demagnetisation period (LS switch 4b closed, HS switch 4a open). The inductor 18 is demagnetised until a trigger signal is received from a zero-cross comparator (not shown). As will be appreciated, the longer the coil magnetisation period, the greater the average output current that is supplied by the Buck converter 4 to whichever of the loads S0, S1, S2 is active.

At time $t_1$, the clock pulse causes the channel logic circuitry 10 to change to outputting a logic high DRVS<1>, in accordance with the channel rotation sequence 2-1-0, thereby indicating that load S1 is to receive the output current from the Buck converter 4. Therefore, the current COILCURRENT is supplied to load S1 for the duration of this clock period (from $t_1$ to $t_2$). Once again, at the start of the clock period (at time $t_1$), the DRVHS signal is set to logic high, causing the inductor 18 to charge. This causes an increase in the current COILCURRENT in the inductor 18.

Although not shown in FIG. 2, the controller 14 subsequently issues a signal indicating that the inductor 18 of the Buck converter 4 may begin to discharge so that the full output current that is required by the load S1 during this stage of the sequence (between $t_1$ and $t_2$) may be delivered. This causes the duty control logic circuitry 12 to cease outputting a logic high DRVHS signal, thereby deactivating the HS switch 4a of the Buck converter 4 and to instead output a logic high DRVLS signal, thereby activating the LS switch 4b. As a result, the current COILCURRENT in the inductor 18 is discharged until the current COILCURRENT reaches zero.

At time $t_2$, the clock pulse causes the channel logic circuitry 10 to change to outputting a logic high signal DRVS<0>, in accordance with the channel rotation sequence 2-1-0, thereby indicating that load S0 is to receive the output current from the Buck converter 4. Therefore, the current COILCURRENT is supplied to load S0 for the duration of this clock period.

As described above, during the period $t_0$ to $t_1$, the current COILCURRENT in the inductor 18 reaches zero before the start of the next clock period $t_1$ to $t_2$, indicating that the Buck converter 4 is operating in DCM during this clock period $t_0$ to $t_1$.

In clock period $t_3$ to $t_4$, the current COILCURRENT is once again supplied to load S2. For this clock period, $t_3$ to $t_4$, the current required by the load S2 is greater than that required during clock period $t_0$ to $t_1$. As the required output current increases, the required duty cycle increases (i.e., the conventional PWM signal PWMCMP2 is issued later in the clock period). In this case, the required output current is sufficiently high that the total required current for this clock period $t_3$ to $t_4$, cannot be supplied by the Buck converter 4 whilst operating in DCM. Therefore, at time 22, the duty limiter signal DUTYLIM2 is issued before the conventional PWM signal PWMCMP2.

Thus, the DUTYLIM2 signal causes the duty control logic circuitry 12 to cease outputting a logic high DRVHS signal, thus causing the HS switch 4a to be deactivated, and to instead output a logic high DRVLS signal, thus causing the LS switch 4b to be activated. As can be seen in FIG. 2, the current COILCURRENT reaches zero exactly at time $t_4$, meaning that the Buck converter 4 is on the verge of moving into CCM, but is still operating in DCM.

It will be appreciated that, when the duty limiter signal DUTYLIM2 is received before the conventional PWM signal PWMCMP2, the output of the Buck converter 4 is limited, meaning that the output voltage $V_{out}$ drops. The dropout voltage of the LDO 30 is set such that the LDO 30 begins to conduct when the output voltage $V_{out}$ drops below the input voltage $V_{in}$ by a predetermined amount. The LDO 30 may then provide the remaining current. Thus, it will be appreciated that the LDO 30 provides only the surplus current that the Buck converter 4 cannot provide whilst operating in DCM. During normal (i.e. non-limited) DCM operation of the Buck converter 4, the LDO 30 is not used and draws only a small current.

As noted above, further dedicated duty limiter modules and LDOs are arranged in the same way as described above to monitor and control the supply of power to the remaining loads S1, S0. This ensures that all of the loads S2, S1, S0 are provided with the required power whilst simultaneously ensuring that the Buck converter 4 continues to operate in DCM.

Thus, it will be appreciated that the circuit 2 can ensure full output current capability for each of the loads S2, S1, S0 whilst simultaneously ensuring DCM operation of the Buck converter 4.

The invention claimed is:

1. A circuit portion for providing a target current to an output load and comprising:
   a DCDC converter comprising an inductor and configured to charge and discharge the inductor according to a duty cycle to provide current to the output load;
   a duty module configured to determine the duty cycle such that the DCDC converter will output the target current; and
   a duty limiter module configured to cause the inductor to discharge early if the determined duty cycle exceeds a threshold, wherein the duty limiter module is configured to:
   a) identify a maximum voltage value that may be supplied to an output load whilst operating the DCDC converter in discontinuous conduction mode;
   b) determine an ideal duty cycle using the maximum voltage value and an input voltage supplied to the DCDC converter, wherein the ideal duty cycle is a duty cycle required for the DCDC converter to supply the maximum voltage value; and
   c) set the threshold to be less than or equal to the ideal duty cycle.

2. The circuit portion of claim 1, further comprising a voltage regulator arranged in parallel with the DCDC converter.

3. The circuit portion of claim 2, wherein the voltage regulator is configured to provide current to the output load when the determined duty cycle exceeds a threshold.

4. The circuit portion of claim 3, wherein the voltage regulator comprises a low-dropout voltage regulator, and wherein a target voltage of the low-dropout voltage regulator is set to be lower than a target voltage of the DCDC converter by a predetermined amount, the target voltage of the DCDC converter being a voltage required to deliver the target current.

5. The circuit portion of claim 1, wherein the duty module is configured to determine the duty cycle from one or more of:
    a value of an input voltage;
    a value of an output voltage required by the output load; and
    a value of an output current.

6. The circuit portion of claim 1, wherein the duty limiter module is configured to compare a length of the duty cycle determined by the duty module with the threshold, wherein said length is a length of time for which the inductor is to be charged, according to the duty cycle.

7. The circuit portion of claim 1, wherein the circuit portion is configured to provide current to a plurality of output loads.

8. The circuit portion of claim 7, further comprising channel logic circuitry configured to provide current to each of the plurality of output loads in turn according to a cyclical sequence comprising a plurality of time slots.

9. The circuit portion of claim 8, wherein the duty limiter module is configured to output a duty limiter signal at a latest time within a time slot that the inductor must begin to discharge in order for the inductor to fully discharge before the end of the time slot.

10. The circuit portion of claim 9, further comprising duty control logic circuitry configured to receive at least one of:
    a duty signal output from the duty module, wherein the duty module is configured to output the duty signal at a time when, in accordance with the duty cycle, the inductor must begin to discharge in order to provide all of the target current to the output load; and
    the duty limiter signal output from the duty limiter module;
    wherein the duty control logic circuitry is configured to cause the inductor to discharge in response to receiving either one of the duty signal or the duty limiter signal.

11. The circuit portion of claim 7 comprising a dedicated duty module for each of the plurality of output loads.

12. The circuit portion of claim 7, comprising a dedicated duty limiter module for each of the plurality of output loads.

13. The circuit portion of claim 1, wherein the threshold is a longest time for which the inductor can be charged without forcing the DCDC converter into continuous conduction mode.

14. The circuit portion of claim 1, wherein the DCDC converter comprises a high side transistor and a low side transistor, and wherein the circuit portion comprises duty control logic circuitry configured to control the low side transistor and the high side transistor of the DCDC converter in accordance with the determined duty cycle.

15. The circuit portion of claim 14, wherein the duty control logic circuitry is further configured to control the low side transistor and the high side transistor of the DCDC converter to cause the inductor to discharge in response to the determined duty cycle exceeding the threshold.

\* \* \* \* \*